United States Patent
Li et al.

(10) Patent No.: US 11,265,438 B2
(45) Date of Patent: Mar. 1, 2022

(54) SCANNER CARRIAGE DEVICES TO PREVENT TILTING

(71) Applicants: Hewlett-Packard Development Company, L.P., Spring, TX (US); Da Peng Li, Shanghai (CN); Zhi Wen Xing, Shanghai (CN); Feng Chen, Shanghai (CN)

(72) Inventors: Da Peng Li, Shanghai (CN); Zhi Wen Xing, Shanghai (CN); Feng Chen, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,593

(22) PCT Filed: Apr. 26, 2018

(86) PCT No.: PCT/CN2018/084560
§ 371 (c)(1),
(2) Date: Sep. 4, 2020

(87) PCT Pub. No.: WO2019/205042
PCT Pub. Date: Oct. 31, 2019

(65) Prior Publication Data
US 2021/0037161 A1    Feb. 4, 2021

(51) Int. Cl.
*H04N 1/00*    (2006.01)
*H04N 1/10*    (2006.01)
*G06F 3/12*    (2006.01)

(52) U.S. Cl.
CPC ... *H04N 1/1026* (2013.01); *H04N 2201/0442* (2013.01); *H04N 2201/04755* (2013.01)

(58) Field of Classification Search
CPC .... H04N 1/1013; H04N 1/1026; H04N 1/193; H04N 1/103; H04N 1/00549; H04N 2201/02491; H04N 2201/0442; H04N 2201/046; H04N 2201/04755; B41J 25/316; B41J 25/304; B41J 25/001
USPC .................. 358/494, 497, 474, 483
See application file for complete search history.

(56) References Cited

U.S. PATENT DOCUMENTS

| 4,112,303 | A | * | 9/1978 | Brandt | ..................... A61B 6/04 269/289 MR |
| 5,625,469 | A |   | 4/1997 | Wheeler et al. | |
| 6,169,611 | B1 |  | 1/2001 | Brook et al. | |
| 6,761,250 | B1 | * | 7/2004 | Szentistvany | ......... B66B 9/0846 187/201 |

(Continued)

FOREIGN PATENT DOCUMENTS

| CN | 201569787 | 9/2010 |
| DE | 202012012635 | 7/2013 |

(Continued)

*Primary Examiner* — Chad Dickerson
(74) *Attorney, Agent, or Firm* — HP Inc. Patent Department (57) ABSTRACT

An example device includes a U-shaped body to be placed around a guide on which a scanner carriage is to be guided. A fixed leg of the U-shaped body is attached to a linearly translatable scanner carriage. A free leg of the U-shaped body is not attached to the scanner carriage and has inward facing ribs. The ribs on the free leg of the U-shaped body are positioned to come into contact with the guide to align the scanner carriage with the guide.

14 Claims, 7 Drawing Sheets

(56) References Cited

U.S. PATENT DOCUMENTS

| | | | |
|---|---|---|---|
| 6,879,413 B1 | 4/2005 | Hayashi et al. | |
| 7,275,882 B2 | 10/2007 | Ishikawa et al. | |
| 7,438,380 B2 | 10/2008 | Ishikawa | |
| 7,768,679 B2 | 8/2010 | Yamaguchi | |
| 9,426,325 B2 | 8/2016 | Enomoto et al. | |
| 9,718,291 B2 | 8/2017 | Elferink | |
| 2008/0170897 A1* | 7/2008 | Harada | G03G 21/00 399/346 |
| 2017/0106684 A1* | 4/2017 | Elferink | B41J 25/001 |

FOREIGN PATENT DOCUMENTS

| | | | |
|---|---|---|---|
| JP | 2001092054 | | 4/2001 |
| JP | 2005191929 | | 7/2005 |
| JP | 2005191929 A | * | 7/2005 |
| JP | 2015195500 A | * | 11/2015 |

* cited by examiner

SCANNER CARRIAGE DEVICES TO PREVENT TILTING

BACKGROUND

Typical construction of digital image scanners, particularly those described as "flatbed scanners", employs a generally rectangular-shaped scanner housing or carriage supporting a platen glass against which one may lay a piece of media, such as a piece of paper for scanning. An optical scanner head situated in the carriage moves opposite the media and scanner associated software and/or firmware typically transforms an optical image of the media into a data file. Construction of flatbed scanners typically employs an optical carriage, housing an optical scanning head or the like; a carriage rod that aligns and guides the optical carriage down a scan-path below the platen; and a motorized drive mechanism employing a direct-current (DC) motor and/or stepper motor. Some designs incorporate a carriage self-driving and rack system that moves the carriage back and forth across the platen.

BRIEF DESCRIPTION OF THE DRAWINGS

For the purpose of illustration, certain examples constructed in accordance with this disclosure will now be described with reference to the accompanying drawings, in which.

DETAILED DESCRIPTION

In the following detailed description, reference is made to the accompanying drawings. The examples in the description and drawings should be considered illustrative and are not intended as limiting to the specific example or element described. Multiple examples can be derived from the following description and drawings through modification, combination or variation of the different elements.

The disclosure is directed to a scanner carriage tilt preventing device that is attached to the leading edge of a scanner carriage and that engages the guide wire or track upon which the carriage moves when the scanner is in use. The device includes a substantially U-shaped body. The device is to surround, but not normally engage, the guide wire or track that the carriage traverses when in use. The disclosure relates to a device that ensures carriages are stably moved without tilting during operation of the scanner.

The disclosure is directed to a U-shape slide positioned over the guide wire or track (the "guide") on which a scanner carriage travels when in use that limits a scanner carriage's horizontal direction tilting angle.

Other U-shaped carriage tilt preventing devices have been disclosed in the prior art. When a moving carriage experiences an unexpected force, which deviates the carriage from its intended path of movement, the free leg of the U-shaped body engages the guide wire/track up-righting the carriage and preventing undesirable tilting. The problem with the prior art devices is that when the free leg of the U-shaped body engages the guide wire/track, friction is created between the U-shaped body and the guide wire/track. If the friction is great enough, the scanner carriage drags resulting in unwanted jams.

The disclosure resolves this issue by including inwardly facing ribs about the length of the free leg of the U-shaped body. The ribs, which come in contact with the guide wire/track when the carriage experiences an unexpected force, have less contact area than the traditional "rib-less" U-shaped tilt preventing devices found in the prior art. Less surface area produces less of the friction that impedes the movement of the carriage causing carriage jams while reducing the tilting angle from 1.4° to 0.5°.

It should be appreciated that the anti-tilting device may be designed so as to be compatible with the left or right side of a scanner carriage. The description provided herein is directed to an example device that is installed on the left leading edge of a scanner carriage.

Figure 1:
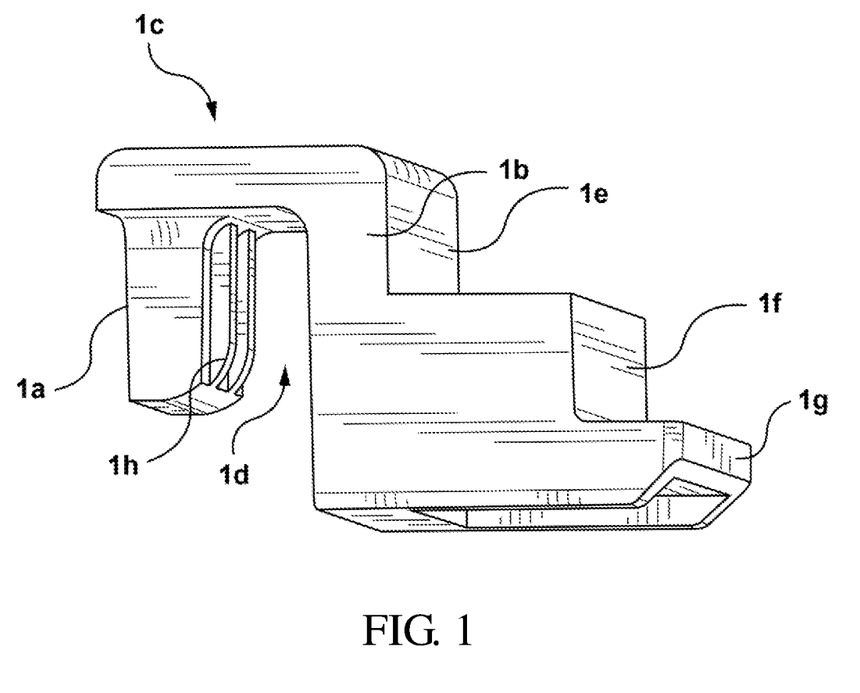
FIG. 1 is an angled view of an example scanner carriage anti-tilting device from the perspective of a free leg of a U-shaped body.

Referring to FIG. 1, an example device is comprised of a U-shaped body having two vertical legs 1a and 1b and a horizontal segment 1c situated between said vertical legs. One vertical leg, referred to as the "fixed" leg 1b, is affixed to the leading edge of a traditional scanner carriage. In the example depicted on FIG. 1, the device is configured to be affixed to the left leading edge of a scanner carriage. In another example (not shown), the U-shaped device is configured to be affixed to the right leading edge of a scanner carriage. The U-shaped body defines an interior space 1d. The U-shaped body may have a curved shape, as depicted in FIG. 1, or a more square-like shape not depicted. The U-shaped body may be formed so as to create a "curved" inner space (shown in FIG. 1) or a "squared" inner space (not represented).

Figure 3:
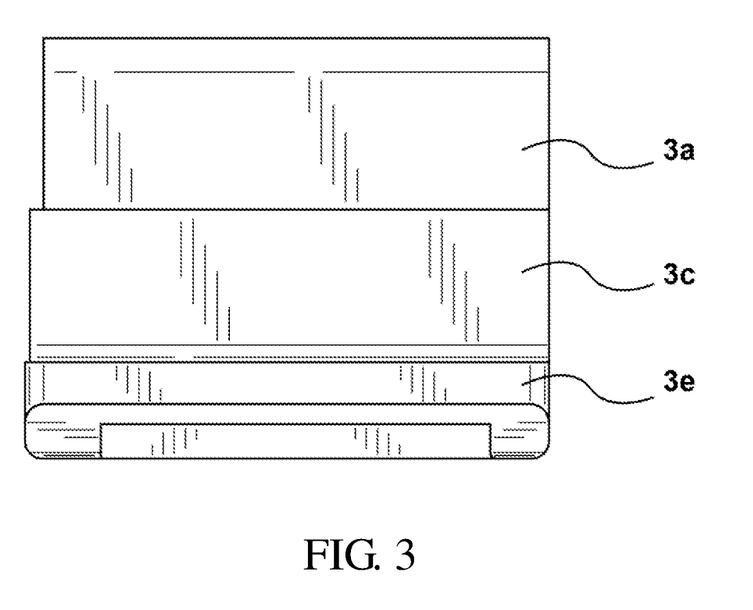
FIG. 3 is a side view of an example scanner carriage anti-tilting device from the perspective of a right side of a device or a fixed leg of a U-shaped body.

The fixed leg 1b of the U-shaped body maybe formed with additional surfaces 1e-g and FIG. 3 that correspond to the shape of scanner carriage to which it is affixed to. When installed, these additional surfaces 1e-g are flush with the outer edges of the scanner carriage, providing additional support for the U-shaped device and better securing the device to the carriage when in use. These additional surfaces 1e-g may also include additional means in which to secure the anti-tilting device to a scanner carriage.

The leg opposing the fixed leg 1b, referred to as the "free" leg 1a is used to keep the scanner carriage on the guide after the scanner experiences an unwanted force. The free leg 1a of the U-shaped body includes ribs 1h to intermittently contact the guide to align the carriage with the guide as needed. The free leg 1a of the example device may have one or more ribs 1h. The guide on which the scanner carriage travels is situated within the interior space 1d between the free leg 1a and fixed leg 1b. When the scanner experiences an unwanted force that disrupts the movement of the scanner carriage, the free leg 1b, and in particular the ribs 1h located thereon, come in contact with the guide on which the carriage travels. This contact keeps the carriage from completely disengaging the guide resulting in tilting. Anti-tilting devices in the prior art failed to recognize the advantages of including ribs as opposed to the flat surface of the past. By decreasing the surface area that comes in contact with the guide by use of ribs 1h, the instant example decreases the static friction created by the contact of the ribs 1h with the guide. Friction can cause scanner carriage jams that result in scanner malfunctions.

The free leg 1a and the fixed leg 1b may be equal in length or of varying lengths and may have equal or varying widths. The free leg 1a, with respect to the horizontal portion 1c of the U-shaped body, may be of equal width or the horizontal portion 1c may have a greater width than the free leg 1a. In a preferred example, the free leg 1a is equal in width with the fixed leg 1b, but is shorter in length. In this example, the edges of the horizontal portion 1c may overhang the free leg 1a. The U-shaped body may be formed as one unit or the free leg 1a may be formed separately and affixed to the horizontal portion 1c later in the manufacturing process. The free leg 1a may be semi-flexible or rigid. The inner surfaces of the parts of the U-shaped body 1a, 1b and 1c, including the ribs 1h found on the free leg 1a, may be flat, concave or convex.

Figure 2:
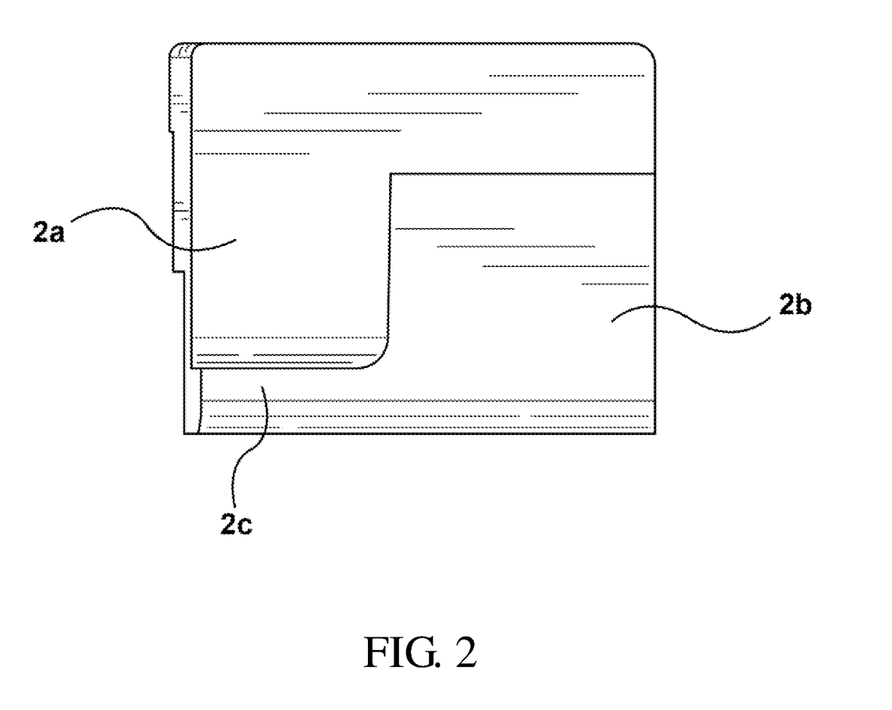
FIG. 2 is a side view of an example scanner carriage anti-tilting device from the perspective of a left side of a device or a free leg of a U-shaped body.

Referring to FIG. 2, is a representative view from the side of the device having the free leg in the foreground. As show, the anti-tilting device has a free leg 2a, a fixed leg 2b and a horizontal portion (not shown) which separates the two legs 2a and 2b creating an interior space 2c. The device is installed in such a manner as to situate the guide (not shown) within the interior space 2c. As the scanner carriage moves, the guide remains within the interior space 2c coming in contact with the free leg 2a when a force sufficient enough to displace the moving carriage is applied to the scanner. The ribs (not shown) of the free leg 2a engage the guide preventing the scanner carriage from "jumping" the guide which in turn "tilts" the scanner carriage.

FIG. 3 is a representative view of the example device from the side opposing the side having the free leg as depicted in FIG. 2. The additional surfaces formed into the fixed leg are shown. These surfaces are parallel to the fixed leg. Those additional surfaces that are perpendicular to the fixed leg are not represented.

Figure 4A:
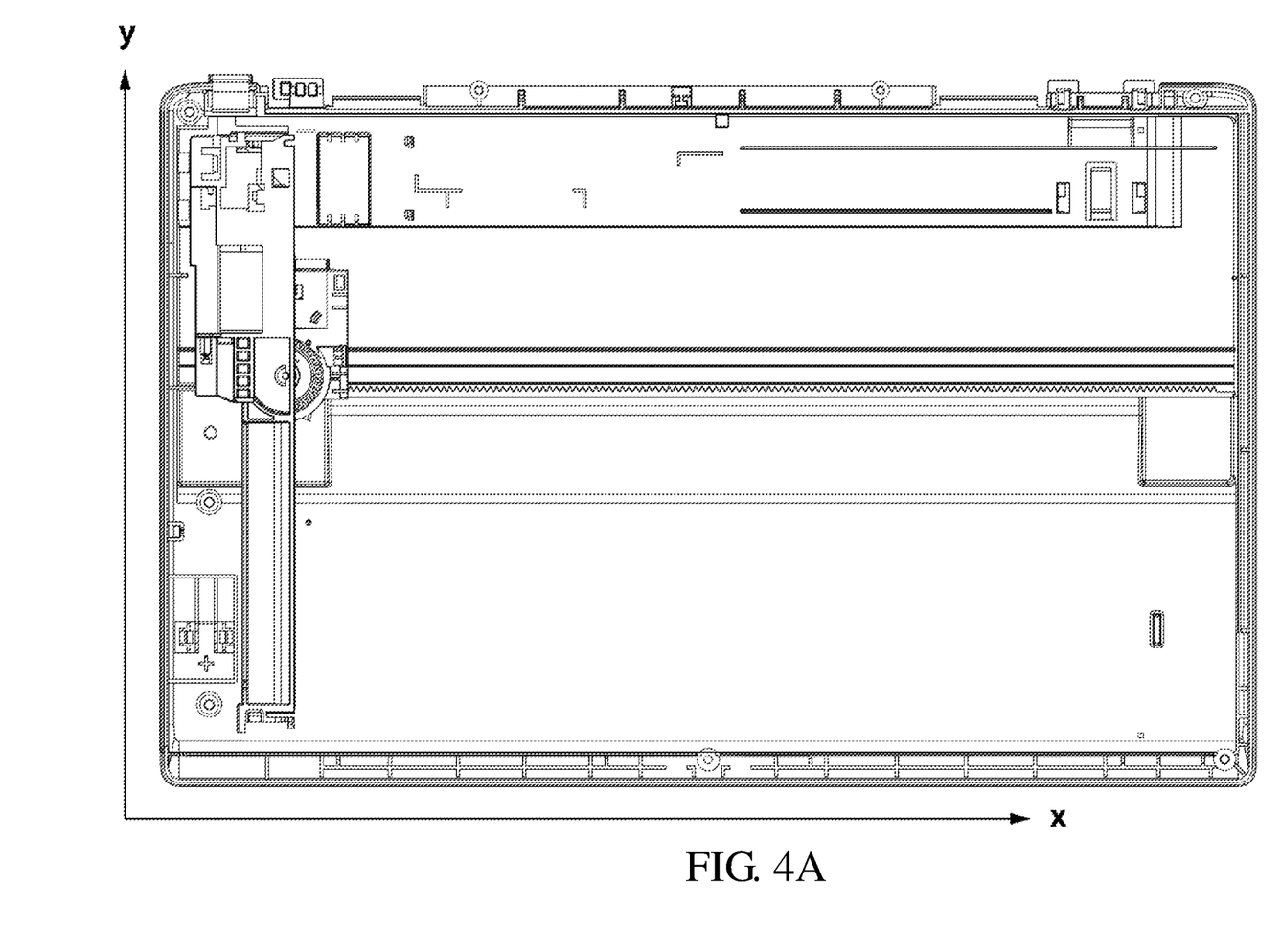
FIG. 4A illustrates an example scanner carriage without an anti-tilting device affixed thereto illustrating the angle of tilting in a Y-direction as the carriage moves along the guide in an X-direction.
Figure 4B:
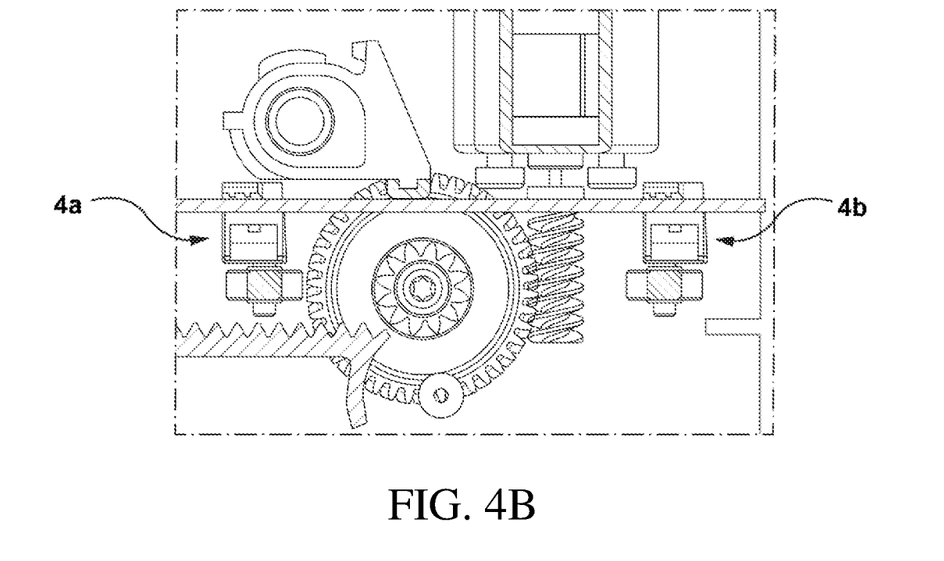
FIG. 4B illustrates an example standard scanner carriage after installation of two example scanner carriage anti-tilting devices on both sides of the carriage.
Figure 4C:
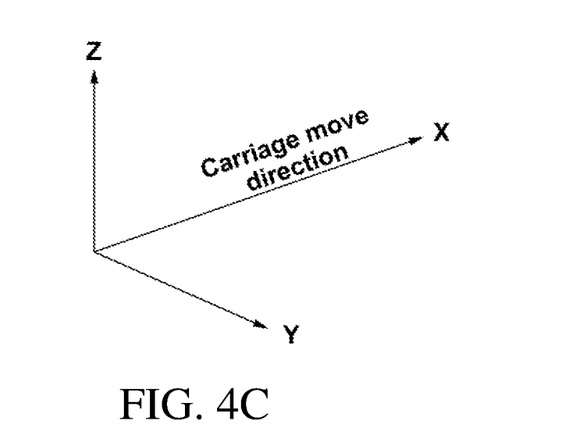
FIG. 4C is a graphic representation example angles of tilting in a Y-direction and a Z-direction as an example scanner carriage moves along the guide in an X-direction.

FIG. 4A depicts a standard scanner carriage and how an unwanted force affects the positioning of the carriage. As shown, as the carriage moves along the guide in the X-direction, an unwanted force causes undesirable "tilting" in the Y-direction. FIG. 4B is an illustration of a scanner carriage having two example anti-tiling devices 4a, 4b affixed to both sides of a standard scanner carriage. As depicted in FIG. 4C, such devices prevent tilting in either the Y- or Z-directions (depending on the direction of the unwanted force) as the carriage moves about the guide in the X-direction.

Figure 5:
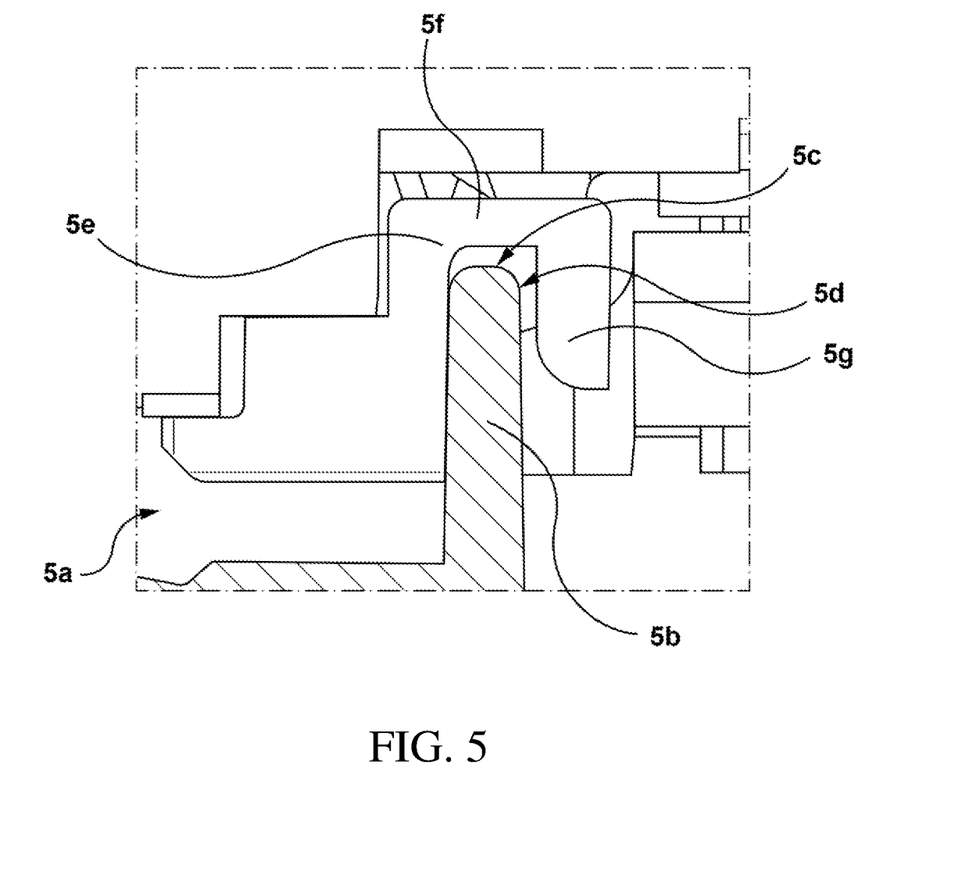
FIG. 5 illustrates an enlarged, side view of an example scanner carriage anti-tilting device after installation on the carriage.

Referring to FIG. 5, the example anti-tilting device 5a is configured to provide for free space (a "gap") 5c and 5d between the device 5a and the guide 5b. These gaps 5c and 5d ensure that the devices do not unnecessarily come in contact with the guide 5b when the scanner is in use. Unnecessary contact of the device 5a with the guide 5b results in the build-up of friction which can result in carriage jams, unnecessary wear and tear of the device and/or guide and other undesirable results. The fixed leg 5e of the device 5a, however, is designed to slide along the guide 5b to ensure that the carriage remains positioned about the guide 5b while in use. As noted previously, when the carriage experiences an unwanted force, the free leg 5g prevents the carriage from tilting or coming off the guide. It is recommended that a gap of between 0.3 and 0.8 mm be maintained between the horizontal portion 5f of the U-shaped body 5a and the guide 5b as well as between the free leg 5g and guide 5b.

Figure 6:
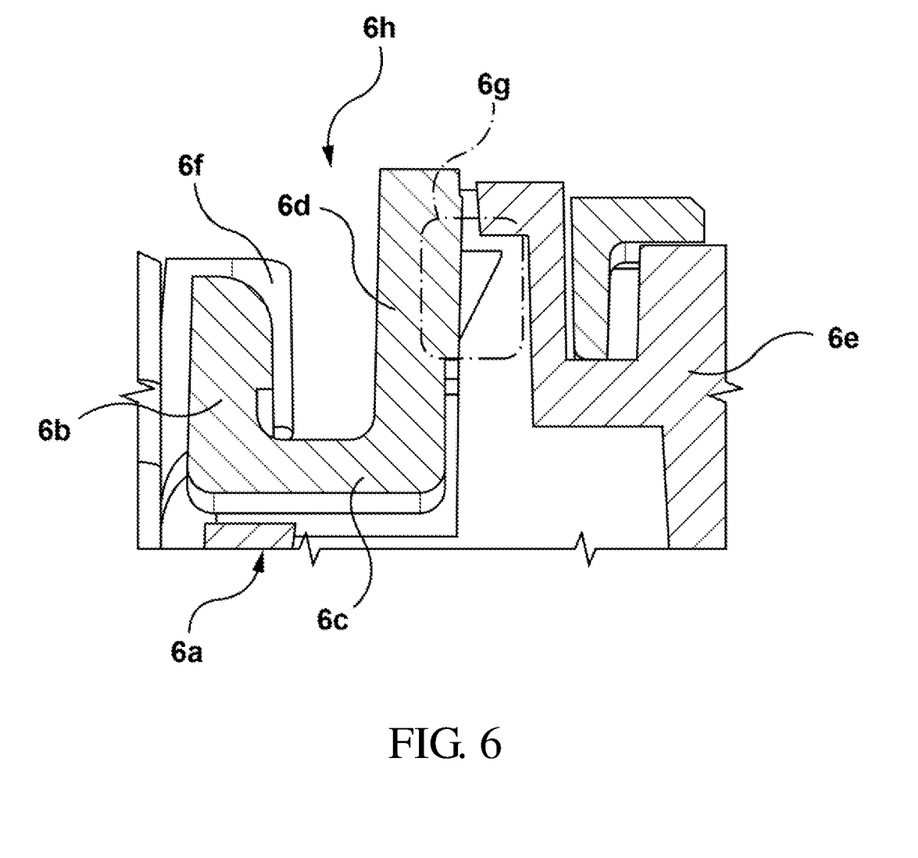
FIG. 6 illustrates an enlarged, side view of an example hook mechanism used to affix an example scanner carriage anti-tilting device to the leading edge of the carriage.

One of the legs of the U-shaped body is attached to the leading edge of the scanner carriage by, for example, a hook 6g. FIG. 6 illustrates an enlarged, side view of the hook mechanism 6g used to affix the example device 6a to the leading edge of a scanner carriage 6e. As shown in this example, part of a hook device 6g is embedded into the fixed leg 6d of the U-shaped body 6a during the process in which to manufacture the device or after the device has been manufactured. The hook device 6g, or an equivalent thereof, may also be attached to one of the outer surfaces of the fixed leg 6d during manufacture or shortly thereafter. A portion of the hooking device 6g extends outward to the scanner carriage 6e to which it is affixed. The extended portion may also be embedded into the housing of the carriage 6e, or the exterior of the carriage may be configured with means to accept the extended part of the hook via a latch, indentation, aperture or any similar means (not shown). Once secured, the anti-tilting device 6a is placed about the guide 6f which, when the scanner is in use, allows for the carriage 6e/anti-tilting device 6a to move across the guide 6f which is situated in the interior space 6h of the example device 6a.

An adhesive to affix the anti-tilting device to the scanner carriage may not be needed, unlike the prior art devices. Heat may be a by-product of the use of a scanner which can reach temperatures sufficient to weaken or melt most adhesives. In addition, traditional scanners tend to vibrate during use which can also result in adhesive failure.

The device may be formed by molding, thermal forming, vacuum forming, or similar process. It may be a solid complete structure, have a hollow center or varying size or be comprised in pieces which are assembled together after the molding/forming process is complete. The may be pre-fabricated and affixed to a scanner carriage prior to said scanner being assembled or it might be affixed in situ after scanner assembly. Scanner carriages may be fabricated with means in which to affix the anti-tilting device during manufacturing of the scanner carriage body or may be modified after installation. Low friction materials having a static co-efficient of friction that is less than said material's dynamic co-efficient of friction, such as high-temperature polymers or some metals, which have low coefficients of friction, are ideal for applications where friction is a consideration. Examples of plastics that perform well in friction applications, include UHMW, PEEK (polyetheretherketone), polycarbonate, nylon and acetal which are excellent choices for wear applications that involve sliding. These materials are also available in formulations that include additives and fillers to improve sliding wear performance.

The interior sides of the parts of the U-shaped body, including the ribs on the free leg, may also be coated with a metal infused with polytetrafluoroethylene (Teflon®), such as Electroless Nickel infused with Teflon® or a nickel-cobalt-boron alloy. The composites of nickel and Teflon® resists wear and has a low coefficient of friction.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

The invention claimed is:

1. A device comprising:
   a U-shaped body to be placed around a guide on which a scanner carriage is to be guided, a fixed leg of the U-shaped body to be attached to a linearly translatable scanner carriage; and
   inward facing ribs on a free leg of the U-shaped body, the free leg not attached to the scanner carriage;
   wherein the ribs on the free leg of the U-shaped body are positioned to come into contact with the guide to align the scanner carriage with the guide;
   wherein when said device is installed onto said guide, a gap of between 0.3 and 0.8 mm in length exists between the U-shaped body and the guide.

2. The device according to claim 1, further comprising a squared or rounded horizontal section situated between the free leg and the fixed leg affixed to the scanner wherein the free leg of the U-shaped by is longer than, shorter than or equal in length with the fixed leg of the U-shaped body and/or the free leg of the U-shaped body is wider than, narrower than or equal in width with the fixed leg of the U-shaped body.

3. The device according to claim 1, wherein the free leg of the U-shaped body is rigid or semi-flexible.

4. The device according to claim 1, wherein outer surfaces of the inward facing ribs or of the fixed leg are flat, convex or concave or any combination thereof, in shape.

5. The device according to claim 1, wherein the U-shaped body comprises a hollow interior or solid interior.

6. The device according to claim 1, further comprising additional surfaces on the fixed leg of the U-shaped body consistent with a shape of the scanner carriage to which it is attached wherein when said device is installed said additional surfaces are flush with a leading edge of the scanner carriage stabilizing the device after installation.

7. The device according to claim 1, wherein said device is comprised of a material having a static co-efficient of friction less than said material's dynamic co-efficient of friction further wherein said material is a high-temperature polymer or metal or is coated with electroless nickel infused with polytetrafluoroethylene.

8. The device according to claim 1, further comprising a hook to affix the device to the scanner carriage.

9. The device according to claim 1, configured to be affixed to either a left or a right leading edge of the scanner carriage.

10. The device according to claim 1, wherein said device reduces a tilting angle to 0.5°.

11. A scanner carriage comprising:
    a U-shaped body to be placed around a guide on which said scanner carriage is to be guided, a fixed leg of the U-shaped body to be attached to a linearly translatable scanner carriage; and
    inward facing ribs on a free leg of the U-shaped body, the free leg not attached to the scanner carriage;
    wherein the ribs on the free leg of the U-shaped body are positioned to come into contact with the guide to align the scanner carriage with the guide;
    wherein when said U-shaped body is installed onto said guide, a gap of between 0.3 and 0.8 mm in length exists between the U-shaped body and the guide.

12. The scanner carriage according to claim 11, wherein U-shaped body is pre-fabricated to the scanner carriage prior to installation of the scanner carriage into the scanner.

13. A scanner comprising:
    a scanner carriage having a U-shaped body to be placed around a guide on which said scanner carriage is to be guided, a fixed leg of the U-shaped body to be attached to a linearly translatable scanner carriage; and
    inward facing ribs on a free leg of the U-shaped body, the free leg not attached to the scanner carriage;
    wherein the ribs on the free leg of the U-shaped body are positioned to come into contact with the guide to align the scanner carriage with the guide;
    wherein when said U-shaped body is installed onto said guide, a gap of between 0.3 and 0.8 mm in length exists between the U-shaped body and the guide.

14. The scanner according to claim 13, having a tilting angle of 0.5° or less.

* * * * *